United States Patent
Cannon et al.

(10) Patent No.: US 9,875,580 B2
(45) Date of Patent: Jan. 23, 2018

(54) ACTIVITY TRIGGERED PHOTOGRAPHY IN METAVERSE APPLICATIONS

(71) Applicant: International Business Machines Corporation, Armonk, NY (US)

(72) Inventors: Ulysses L. Cannon, Durham, NC (US); Angela Richards Jones, Durham, NC (US); Ruthie D. Lyle, Durham, NC (US); Susan S. McVey, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 589 days.

(21) Appl. No.: 14/536,136

(22) Filed: Nov. 7, 2014

(65) Prior Publication Data

US 2015/0062113 A1    Mar. 5, 2015

Related U.S. Application Data

(63) Continuation of application No. 12/614,475, filed on Nov. 9, 2009, now Pat. No. 8,893,047.

(51) Int. Cl.

| A63F 13/525 | (2014.01) |
|---|---|
| G06T 19/00 | (2011.01) |
| G06N 3/00 | (2006.01) |
| H04L 29/06 | (2006.01) |

(52) U.S. Cl.
CPC .......... *G06T 19/006* (2013.01); *G06N 3/006* (2013.01); *H04L 67/38* (2013.01); *A63F 13/525* (2014.09); *G06T 2210/21* (2013.01)

(58) Field of Classification Search
CPC ..... G06T 19/00; G06T 19/003; G06T 19/006; G06T 19/20; G06T 2210/21; G06N 3/006; A63F 13/525; A63F 13/5252; A63F 13/5255; A63F 13/5258; H04L 67/38

See application file for complete search history.

(56) References Cited

U.S. PATENT DOCUMENTS

| 5,920,692 | A | 7/1999 | Nguyen et al. |
|---|---|---|---|
| 8,026,913 | B2 | 9/2011 | Garbow et al. |
| 8,089,479 | B2 | 1/2012 | Deb et al. |
| 2003/0038805 | A1* | 2/2003 | Wong ............... A63F 13/12 345/473 |
| 2004/0002380 | A1 | 1/2004 | Brosnan et al. |
| 2004/0051745 | A1 | 3/2004 | Gargi |
| 2004/0085335 | A1 | 5/2004 | Burlnyk et al. |

(Continued)

OTHER PUBLICATIONS

Ah Kun et al., "Co-Present Photo Sharing on Mobile Devices", Mobile HCI '07, Sep. 9-12, 2007, pp. 277-284.

(Continued)

*Primary Examiner* — Abdullah Al Kawsar
*Assistant Examiner* — Daniel Samwel
(74) *Attorney, Agent, or Firm* — Daniel Simek; Hoffman Warnick LLC

(57) ABSTRACT

A system, method and program product for collecting image data from within a metaverse. A system is provided that includes: a graphical user interface (GUI) for allowing a user to install and administer a camera within the metaverse; a system for collecting image data from the camera based on an occurrence of a triggering event associated with the camera; and a system for storing or delivering the image data for the user.

9 Claims, 3 Drawing Sheets

(56) References Cited

U.S. PATENT DOCUMENTS

| | | |
|---|---|---|
| 2004/0102245 A1 | 5/2004 | Escalera et al. |
| 2007/0117635 A1* | 5/2007 | Spanton .................. A63F 13/12 463/43 |
| 2007/0265091 A1 | 11/2007 | Aguilar, Jr. et al. |
| 2007/0298886 A1 | 12/2007 | Aguilar, Jr. et al. |
| 2008/0090659 A1 | 4/2008 | Aguilar et al. |
| 2008/0147424 A1 | 6/2008 | Rowan et al. |
| 2008/0158242 A1 | 7/2008 | St. Jacques |
| 2008/0180438 A1* | 7/2008 | Sasaki ..................... A63F 13/10 345/420 |
| 2008/0268961 A1* | 10/2008 | Brook ..................... A63F 13/12 463/42 |
| 2009/0128549 A1 | 5/2009 | Gloudemans et al. |
| 2009/0237518 A1 | 9/2009 | Cheng et al. |
| 2009/0254222 A1 | 10/2009 | Berman et al. |
| 2009/0262984 A1 | 10/2009 | Hildreth et al. |
| 2009/0285444 A1 | 11/2009 | Erol et al. |
| 2010/0060661 A1* | 3/2010 | Avent ...................... A63F 13/10 345/619 |
| 2011/0007069 A1 | 1/2011 | Lee |
| 2011/0066928 A1 | 3/2011 | Karlsson |
| 2011/0210962 A1 | 9/2011 | Horan et al. |

OTHER PUBLICATIONS

Froehlich et al., "MyExperience: A System for In situ Tracing and Capturing of User Feedback on Mobile Phones", MobiSys '07, Jun. 11-14, 2007, pp. 57-70.

Barrett, Ryan S., U.S. Appl. No. 12/614,475, Notice of Allowance, dated Jul. 8, 2014, 6 pages.

Barrett, Ryan S., U.S. Appl. No. 12/614,475, Non-Final Rejection, dated Jan. 28, 2014, 18 pages.

Barrett, Ryan S., U.S. Appl. No. 12/614,475, Final Rejection, dated Sep. 17, 2012, 26 pages.

Barrett, Ryan S., U.S. Appl. No. 12/614,475, Non-Final Rejection, dated Apr. 26, 2012, 28 pages.

\* cited by examiner

ACTIVITY TRIGGERED PHOTOGRAPHY IN METAVERSE APPLICATIONS

FIELD OF THE INVENTION

This disclosure is related to metaverse applications, and more particularly is related to collecting image data from a metaverse application in response to triggering events within the metaverse.

BACKGROUND OF THE INVENTION

Metaverses, also referred to as virtual universes or worlds, are computer-based simulated environments intended for its users to inhabit, traverse, and interact via avatars, which are personas or representations of the users of the metaverse, and generally take the form of two-dimensional or three-dimensional human or fantastical representations of a person's self. Metaverses, are now most common in massive multiplayer online games, such as Second Life (a trademark of Linden Research, Inc. in the U.S., other countries or both), the Sims Online (a trademark of Electronic Arts Inc. in the U.S., other countries, or both), and World of Warcraft (a trademark of Blizzard Entertainment, Inc. in the U.S., other countries, or both). A feature of such applications is that are persistent, i.e., the virtual worlds exist continuously, even when a given user is not logged in. Avatars in these types of metaverses, which can number well over a million, have a wide range of business and social experiences.

Current metaverse applications allow a user to cause an avatar to take a photograph or video of a nearby scene using, e.g., keystrokes. The photographs or video can then be saved to an avatar's inventory for instance. This however requires the user to be logged in and active in the metaverse.

SUMMARY OF THE INVENTION

The present invention relates to a metaverse application that allows a user to collect image data from the metaverse without being logged in or active in the metaverse at the time the image data is taken. Instead, facilities are provided for allowing the user to selectively place cameras in the metaverse and define triggering events, which when detected, cause image data to be collected. Accordingly, once the camera is installed, image data is collected for the user in an automatic fashion independently of any actions of the user or the user's avatar.

In one embodiment, there is a metaverse system having a camera system for capturing image data from within a metaverse, comprising: a computer system comprising: an interface for installing and administering a camera within the metaverse; a system for collecting image data from the camera based on an occurrence of a triggering event associated with the camera; and a system for storing or delivering the image data.

In a second embodiment, there is a computer readable storage medium having a computer program product stored thereon for capturing image data from within a metaverse, comprising: program code for implementing an interface for installing and administering a camera within the metaverse; program code for collecting image data from the camera based on an occurrence of a triggering event associated with the camera; and program code for storing or delivering the image data.

In a third embodiment, there is a method for capturing image data from within a metaverse, comprising: providing an interface for installing and administering a camera within the metaverse; collecting image data from the camera based on an occurrence of a triggering event associated with the camera; and storing or delivering the image data.

In a fourth embodiment, there is a method of capturing data from within a metaverse for at least one user, comprising: receiving an installation of a recording device within the metaverse; receiving a specification of at least one triggering event associated with the recording device; collecting a resulting set of data; and storing the resulting set of data for at least one user.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
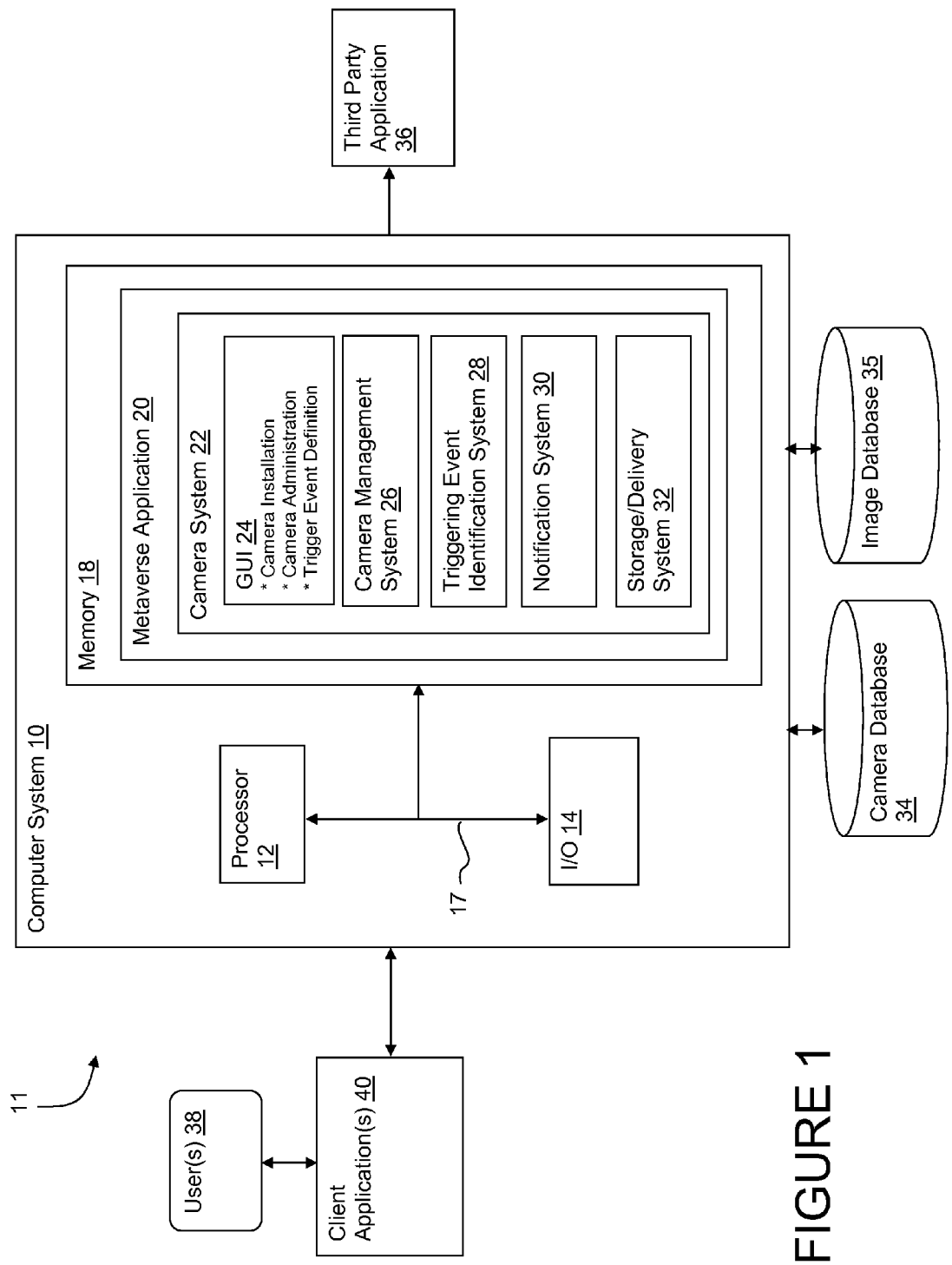
FIG. 1 depicts a computer system with a metaverse application having a camera system in accordance with an embodiment of the invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Described herein is a solution for capturing images within a metaverse. More particularly, the solution allows a camera to capture images for a user independently of the user or the user's avatar, e.g., while the user is not logged into the metaverse application or while the user is logged in, but not controlling a camera. Note that for the purposes of the disclosure, the term "image data" may refer to any type of image, e.g., a still photograph, a video stream, infrared data, etc. In addition, it is understood that the term "camera" refers to a virtual camera for capturing rendered image data in a virtual image space.

FIG. 1 depicts a computer system 10 having a metaverse application 20 that includes a camera system 22 for capturing images in a metaverse instantiated by the metaverse application 20. Metaverse application 20 along with computer system 10 form a metaverse system 11 in which users 38 are able to log in and control their respective avatars in the metaverse via client applications 40, e.g., a browser.

Camera system 22 includes: a GUI (graphical user interface) 24 for allowing a user 38 to install and administer cameras in the metaverse and define triggering events for causing the cameras to collect image data; camera management system 26 that provides a mechanism for tracking and managing cameras in the metaverse; triggering event identification system 28 that provides a mechanism for determining when triggering events occur in the metaverse and causing an associated camera to collect image data; notification system 30 that provides a mechanism for notifying a user 38 that image data has been collected from the metaverse from one of the user's cameras; and storage/delivery system 32 that provides a mechanism for storing collected images and/or delivering images to the user.

As noted, GUI 24 provides an interface for allowing an end user to install and administer one or more cameras in the metaverse. This may include:

(1) Placing a camera at selected location in the metaverse;
(2) Selecting a type of camera;
(3) Defining a field of view and orientation for the camera;
(4) Defining one or more triggering events to cause the camera to collect image data;
(5) Defining whether/how the user 38 is to be notified when image data is collected;
(6) Defining whether/how the image data is to be stored; and
(7) Defining whether/how image data is to be delivered.

Note that while the described embodiment utilizes a GUI 24 to perform the above functions, any type of interface may be utilized, e.g., a application programming interface (API) that allows a third party application to perform the above.

Camera management system 26 tracks and manages all cameras in the metaverse installed by the different users 38. Camera management system 26 stores all settings for each camera, e.g., location, orientation and direction, field of view, image type (e.g., still images, video, high definition, widescreen, infrared, color, black and white, etc), how many images are to be taken, how long a video sequence should be, whether the camera is active at a given point in time, etc. Camera management system 26 maintains a camera database 34 of all the cameras in the metaverse, as well which avatar/user each camera belongs to, and the settings of each camera.

Camera management system 26 may also track and determine when a camera is active (or enabled). For instance, it may be the case that a camera is only to be enabled when a user 38 is logged off, or when a user's avatar is away from the location of the camera, or when a user's avatar is at a particular location in the metaverse, etc. In addition, cameras can be enabled and disabled by the user 38 at any time, e.g., via a set of keystrokes.

Triggering event identification system 28 provides an engine for determining when a triggering event associated with a particular camera has occurred within the metaverse. A triggering event is essentially a rule for dictating when a given camera should capture image data. Triggering events can be defined by a user 38 when they administer a camera via GUI 24. Triggering events may be selected/implemented in any manner, e.g., via a drop down box, based on a set of user entered rules, based on a natural language (NL) input, etc.

In a simple user friendly embodiment, the user 38 can simply select a triggering event from a set of triggering events, e.g., via a drop down box, etc. More complex triggering events may be provided with logical ANDs, ORs, etc., that allows the user 38 to select and combine multiple triggering events. The resulting definition can then be embodied as a rule which the triggering event identification system 28 can continuously analyze.

In a different approach, a user 38 may be able to enter rules directly using a structured command set that follows a predefined protocol/syntax. For instance, a user 38 could define a triggering event via a user entered rules dialog box in GUI 24 such as:

If AVATAR==DETECTED & AVATAR==FRIEND & AVATAR_ACTION==TRANSACTION, then COLLECT IMAGE.

In this example, the user entered command has defined a triggering event to collect image data if an avatar enters the field of view of camera (i.e., is detected) and the detected avatar is a friend and the detected avatar is engaged in a transaction.

In still a further embodiment, the user 38 could simply enter a natural language input that would be parsed and turned into a rule by a natural language engine. For instance, rather than typing in the above rule, the user 38 could simply enter the natural language input "take a picture if a friendly avatar is engaged in a transaction." A natural language engine would then automatically convert the input into a rule (such as the command sequence above) that could be analyzed by triggering event identification system 28. An interactive natural language system could be utilized to resolved ambiguities or ensure the interpreted command is what the user 38 intended.

Triggering events may comprise any type of actions that occur with the metaverse. Moreover, triggering events may be implemented independently of a user action, e.g., when the user is not logged in or resides elsewhere in the metaverse. Illustrative triggering events include, but are not limited to:

An avatar/user having a particular criteria (e.g., co-worker) walking by a location;
The detection of the avatar's friends, where a friend is defined as those associated with the user who placed the camera;
A transaction, for example a, payment action between one or more avatars or retailers, an exchange;
The use of an object;
The act of an avatar attempting to access a secure virtual location, for example a private land parcel;
An avatar in a location performing a particular gesture;
Events/meeting/classes in which filming begins and ends in synch with these activities;
Multiple avatars being within a certain proximity of each other (to capture activities of "groups");
The occurrence of an undesirable activity;
Detection of avatars who have been denoted as "repeat public offenders";
etc.

Upon the detection of a triggering event, triggering event identification system 28 causes an associated camera to collect image data in a manner defined within GUI 24 by the user 38. In a typical embodiment, the triggering event comprises an action occurring within a field of view of the camera, e.g., a friendly avatar passing by, a gesture being detected, etc. However, in other cases, the triggering event could be an occurrence not associated with an action in the field of view, e.g., a clock striking midnight may trigger image data collection within a social club. In any case, the triggering event for a user's camera is generally independent of actions of the user 38 and the user's avatar.

Notification system 30 is responsible for notifying a user 38 when image data has been captured. Notifying can be done in any manner, and can be done via a third party application 36 such as email, text messaging, instant messaging, via a social networking application, etc. In another embodiment, the notification may occur when a user 38 logs in.

Storage and delivery system 32 is responsible for storing and/or delivering image data. Image data may be stored in an image database 35 or elsewhere and/or be delivered to the user 38 in any manner, e.g., via a third party application 36. For instance, image data may be stored in a user's inventory, through which the user 38 can view the image data. Image data may be sent to an external application, for example email, for which the user 38 already has an association, be streamed to an external web application allowing the avatar to consume the image data from a browser application, etc.

Figure 2:
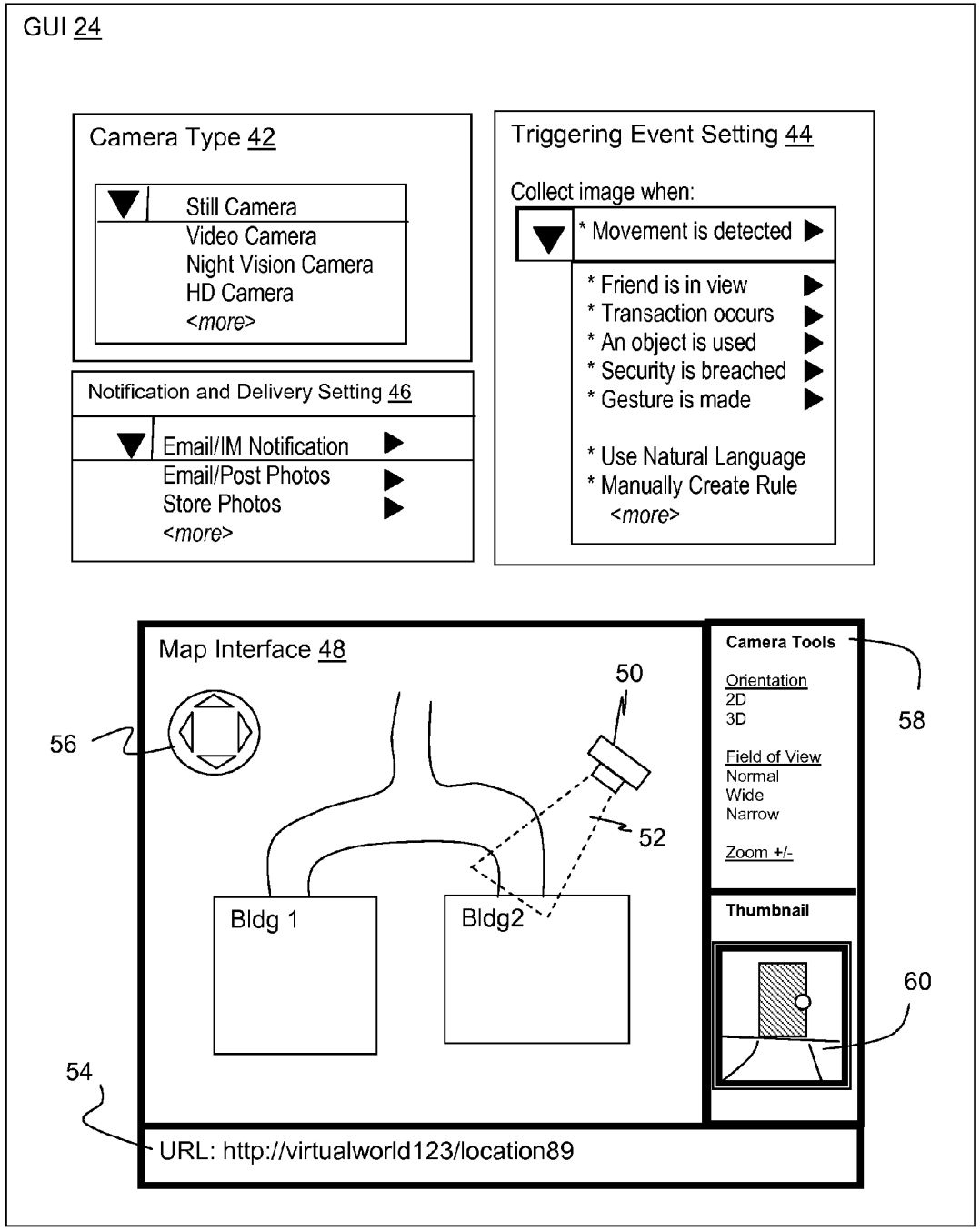
FIG. 2 depicts a GUI for allowing a user to install and administer a camera in a metaverse in accordance with an embodiment of the invention.

FIG. 2 depicts an illustrative GUI 24 for allowing a user to install and administer a camera 50 in a metaverse application. Camera installation in this embodiment is achieved via a map interface 48, which lets a user place and orient a camera 50 in a metaverse scene. In this embodiment, map interface 48 provides an interactive map (similar in concept to, e.g., GOOGLE MAPS®), configured to display the entire metaverse via user navigable views. The map may be navigated in any manner, e.g., using keyboard keys for moving left/right up/down and zooming in and out, using a navigation widget 56 controllable by a pointer device such as a mouse, or entering a URL 54.

Once a desired location is displayed in the map interface 48, the user locates camera 50 within the scene at a desired location. In this example, an outdoor scene is selected that includes two adjacent buildings (Bldg 1 and Bldg 2) and the user has set the camera 50 at the entrance to Bldg 2, e.g., to capture images of avatars coming in and out. Various camera tools 58 may be provided for locating the camera 50 in the scene, setting a field of view, zooming, etc. In addition, a thumbnail image 68 may be presented that depicts a real time view of the camera 50 at its current location. In this case, the map interface 48 shows the scene in a two dimensional (2D) top view. However, three dimensional (3D) views and controls could also be presented for locating the camera 50. Other controls for setting the field of view 52 may also be provided.

In addition, in this GUI 24, the user is able select a camera type 42 (still, video, HD, etc.), select a triggering event setting 44, and select a notification and delivery setting 46 using drop down boxes. It is understood that GUI 24 of FIG. 2 is depicted for illustrative purposes only, and many variations, functional additions, etc., could be provided and fall within the scope of the invention.

Figure 3:
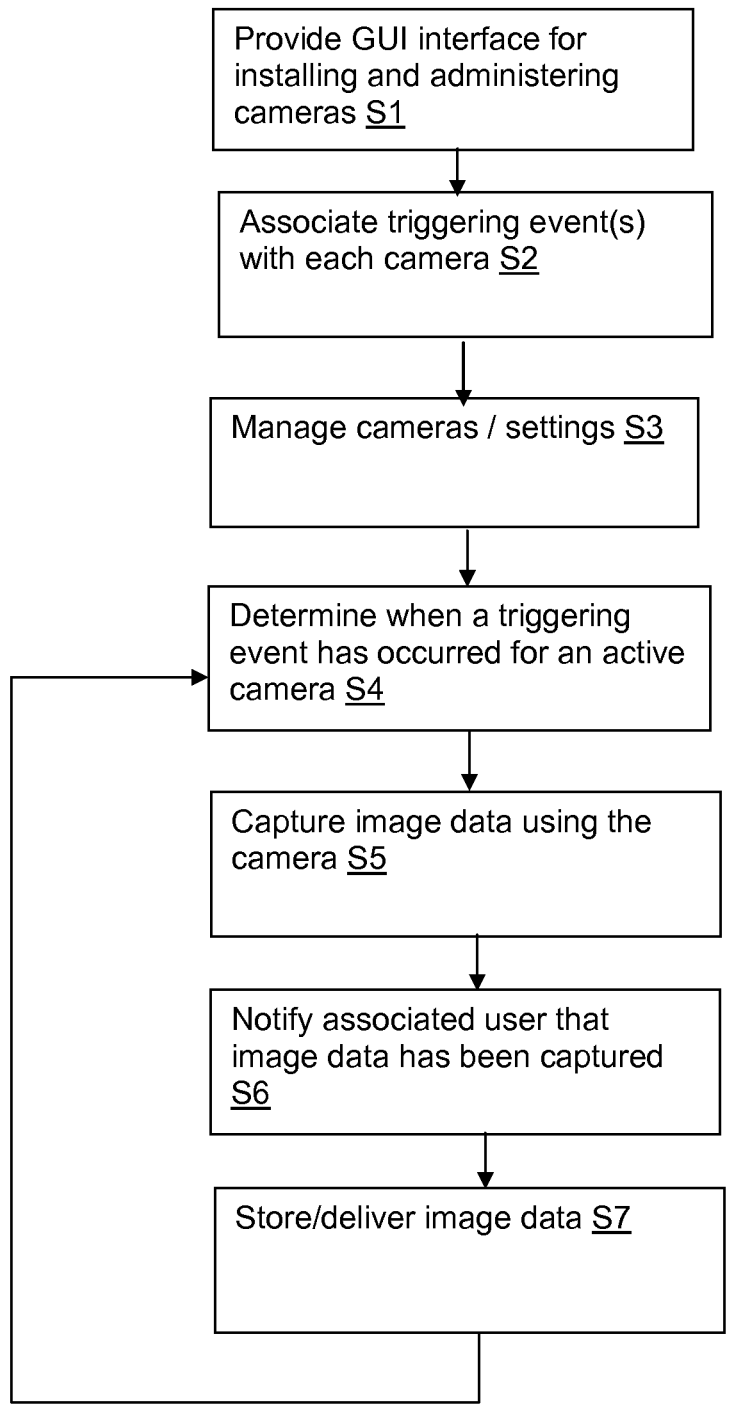
FIG. 3 depicts a flow diagram of a method of collecting image data in accordance with an embodiment of the invention.

FIG. 3 depicts a flow diagram of an illustrative method of implementing a camera system within a metaverse application. At S1, a GUI is provided for allowing users to install and administer cameras. At S2, one or more triggering events are associated with each camera. At S3, a management tool is utilized to track, store and manage each camera and associated settings that have been defined in the metaverse by the users. At S4, it is determined whether a trigger has occurred within the metaverse, and when one does occur, image data for the associated camera is captured at S5. At S6, the associated user is notified that image data has been captured, and at S7 image data is delivered/stored.

Referring again to FIG. 1, it is understood that metaverse application 20 may be implemented using any type of computing device e.g., computer system 10). Such a computing device generally includes a processor 12, input/output (I/O) 14, memory 18, and bus 17. The processor 12 may comprise a single processing unit, or be distributed across one or more processing units in one or more locations, e.g., on a client and server. Memory 18 may comprise any known type of data storage, including magnetic media, optical media, random access memory (RAM), read-only memory (ROM), a data cache, a data object, etc. Moreover, memory 18 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus 17 provides a communication link between each of the components in the computing device and likewise may comprise any known type of transmission link, including electrical, optical, wireless, etc. Although not shown, additional components, such as cache memory, communication systems, system software, etc., may be incorporated.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system comprising a metaverse application 20 could be created, maintained and/or deployed by a service provider that offers the functions described herein for customers. That is, a service provider could offer to deploy or provide the ability to utilize a camera in a metaverse as described above.

Moreover, while the present invention is described with reference to collecting image data, the system and processes described herein could be utilized to capture any type of data within a metaverse, and such applications are within the scope of the invention.

It is understood that in addition to being implemented as a system and method, the features may be provided as a program product stored on a computer-readable storage medium, which when run, enables a computer system to provide a metaverse application 20 with a camera system 22. To this extent, the computer-readable storage medium may include program code, which implements the processes and systems described herein when executed by a computer system. It is understood that the term "computer-readable storage medium" comprises one or more of any type of physical embodiment of the program code. In particular, the computer-readable storage medium can comprise program code embodied on one or more portable storage articles of manufacture (e.g., a compact disc, a magnetic disk, a tape, etc.), on one or more data storage portions of a computing device, such as memory and/or a storage system.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be run substantially concurrently, or the blocks may sometimes be run in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A metaverse system having a camera system for capturing image data from within a metaverse, comprising:
   at least one computer device, including:
      a display;
      a graphical user interface (GUI), rendered on the display, and operated by a user, for installing and administering, by the user, a camera within the metaverse, wherein the GUI includes a map overview of the entire metaverse;
      wherein the user operates the GUI to: move and zoom the map overview of the metaverse to navigate to a metaverse scene within a location of the map overview, place and orient the camera at a desired location within the metaverse scene in the map overview, select a camera type, wherein the camera type is selected from a group consisting of a still camera and a video camera, display a thumbnail with a real-time view of the camera to select a zoom and field of view for the camera, select at least one triggering event for the camera, and select a notification protocol;
      a system for collecting image data from the camera based on an occurrence of a triggering event associated with the camera and input by the user using the GUI, wherein the system for collecting image data includes a system for detecting an action within a field of view of the camera and for generating the triggering event in response to the detecting; and
      a system for storing or delivering the image data to a metaverse inventory of the user;
      wherein image data is collected by the camera in an automatic fashion independently from the user during the absence of the user at the metaverse scene.

2. The metaverse system of claim 1, further comprising a notification system for notifying at least one user when image data has been collected using the selected notification protocol.

3. The metaverse system of claim 2, wherein the notification system interfaces with a third party application.

4. A non-transitory computer readable storage medium having a computer program product stored thereon for implementing a method for capturing image data from within a metaverse when executed on a computing device, the method comprising:
   rendering a graphical user interface (GUI), operated by a user, on a display, the GUI including controls for installing and administering, by the user, a camera within the metaverse, wherein the GUI includes a map overview of the entire metaverse;
   wherein the user operates the GUI to: move and zoom the map overview of the metaverse to navigate to a metaverse scene within a location of the map overview, place and orient the camera at a desired location within the metaverse scene in the map overview, select a camera type, wherein the camera type is selected from a group consisting of a still camera and a video camera, display a thumbnail with a real-time view of the camera to select a zoom and field of view for the camera, select at least one triggering event for the camera, and select a notification protocol;
   collecting image data from the camera based on an occurrence of a triggering event associated with the camera and input by the user using the GUI, wherein the collecting image data includes detecting an action within a field of view of the camera and generating the triggering event in response to the detecting; and
   storing or delivering the image data to a metaverse inventory of the user;
   wherein image data is collected by the camera in an automatic fashion independently from the user during the absence of the user at the metaverse scene.

5. The computer readable storage medium of claim 4, further comprising program code for notifying at least one user when image data has been collected using the selected notification protocol.

6. The computer readable storage medium of claim 5, wherein the notification interfaces with a third party application.

7. A method for capturing image data from within a metaverse, comprising:
   providing an graphical user interface (GUI) on a display of a computing device, the GUI operated by a user, the GUI including controls for installing and administering, by the user, a camera within the metaverse, wherein the GUI includes a map overview of the entire metaverse;
   wherein the user operates the GUI to: move and zoom the map overview of the metaverse to navigate to a metaverse scene within a location of the map overview, place and orient the camera at a desired location within the metaverse scene in the map overview, select a camera type, wherein the camera type is selected from a group consisting of a still camera and a video camera, display a thumbnail with a real-time view of the camera to select a zoom and field of view for the camera, select at least one triggering event for the camera, and select a notification protocol;
   collecting image data from the camera based on an occurrence of a triggering event associated with the camera and input by the user using the GUI, wherein the collecting image data includes detecting an action within a field of view of the camera and generating the triggering event in response to the detecting; and storing or delivering the image data to a metaverse inventory of the user;

wherein image data is collected by the camera in an automatic fashion independently from the user during the absence of the user at the metaverse scene.

8. The method of claim 7, further comprising notifying at least one user when image data has been collected using the selected notification protocol.

9. The method of claim 8, wherein the notifying interfaces with a third party application.

* * * * *